United States Patent [19]

Sato et al.

[11] Patent Number: 5,594,559
[45] Date of Patent: Jan. 14, 1997

[54] STEREOSCOPIC DISPLAY APPARATUS

[75] Inventors: Noriko Sato; Hirokazu Aritake; Masayuki Kato; Manabu Ishimoto; Masato Nakashima, all of Kawasaki, Japan

[73] Assignee: Fujitsu Limited, Kawasaki, Japan

[21] Appl. No.: 632,346

[22] Filed: Apr. 10, 1996

Related U.S. Application Data

[63] Continuation of Ser. No. 105,173, Aug. 12, 1993, abandoned.

[30] Foreign Application Priority Data

Sep. 18, 1992 [JP] Japan .................................. 4-248990

[51] Int. Cl.$^6$ ............................. G03H 1/02; G02B 5/32
[52] U.S. Cl. .................................. 359/8; 359/9; 359/11; 359/14; 359/15; 359/23
[58] Field of Search ........................... 359/8, 9, 10, 11, 359/14, 15, 21, 23

[56] References Cited

U.S. PATENT DOCUMENTS

| | | | |
|---|---|---|---|
| 3,591,252 | 10/1968 | Lu .................................. | 359/9 |
| 3,601,466 | 6/1969 | Tsuruta ........................... | 356/129 |
| 3,891,975 | 6/1975 | Deml .............................. | 359/3 |
| 4,863,225 | 9/1989 | Howard ........................... | 359/8 |
| 5,044,708 | 9/1991 | Garcon ........................... | 359/8 |
| 5,111,313 | 5/1992 | Shires ............................. | 359/17 |
| 5,119,214 | 6/1992 | Nishii et al. ................... | 359/9 |
| 5,198,914 | 3/1993 | Arns ............................... | 359/8 |

FOREIGN PATENT DOCUMENTS

| | | |
|---|---|---|
| 3140418A1 | 5/1983 | Germany . |
| 2209422 | 5/1989 | United Kingdom . |

OTHER PUBLICATIONS

Patent Abstracts of Japan, Publication No. JP57086815, May 31, 1982, vol. 6, No. 168, p. 139.
Proceedings, SPIE, vol. 812, Progress in Holography, 1988, pp. 119–127.

*Primary Examiner*—Frank Gonzalez
*Assistant Examiner*—Jason D. Eisenberg
*Attorney, Agent, or Firm*—Staas & Halsey

[57] ABSTRACT

A space light modulating apparatus and a stereoscopic display apparatus which are used in a rewritable hologram stereoscopic display. A solid image can be properly displayed by a phase distribution of a low spatial frequency. A plurality of flat space light modulating units, each having a predetermined area for performing a wave front conversion while setting a position near the position of a cross point (center position) of a normal line from a virtual display surface of a non-flat shape to display the phase distribution into a producing position of a solid image, are arranged along the virtual display surface such as a cylindrical surface or a spherical surface.

31 Claims, 16 Drawing Sheets

STEREOSCOPIC DISPLAY APPARATUS

This application is a continuation, of application Ser. No. 08/105,173, filed Aug. 12, 1993, now abandoned.

BACKGROUND OF THE INVENTION

The present invention relates to a space light modulating apparatus and a stereoscopic display apparatus which are used for a rewritable hologram stereoscopic display and, more particularly, to a space light modulating apparatus and a stereoscopic display apparatus which can display a solid image at a practical pixel density.

A stereoscopic display is a method of enabling a structure such as depth, thickness, or the like of a 3-dimensional object to be easily visually understood. Such a stereoscopic display is largely demanded in the display field of the structure designed by a CAD or the like or the display field of a medical image. The stereoscopic display has a feeling of a reality, is impressive as compared with the 2-dimensional display, and is also used in the display for amusement in an amusement park, a movie, or the like.

A conventional rewritable hologram stereoscopic display apparatus is realized by using, for example, an acoustic optical element (AOM) for generating a calculated 1-dimensional interference fringe, a rotary mirror, a galvano mirror, a reducing lens, and the like (refer to "Practical Holography VI, #1212–20", SPIE Proc., Vol. 1212, 1990). Since such an apparatus has mechanical movable portions, however, there is a drawback such that it is difficult to realize a large screen and to miniaturize the apparatus.

On the other hand, in association with the recent improvement of the performance of the liquid crystal display apparatus, a space light modulating apparatus which can dynamically change a hologram has been examined. There has been proposed an apparatus in which a phase distribution of the hologram is displayed by using a liquid crystal display apparatus and a solid image is reconstructed by irradiating an illuminate light to the phase distribution (refer to JP-A-64-84933). According to such an apparatus, since the hologram is rewritten by an electrical control, the apparatus can be miniaturized by the installing technique of driving electronic circuits.

In the display of the phase distribution of the hologram using such a conventional liquid crystal display apparatus, however, according to the present technique, a pixel density of the ordinary liquid crystal display apparatus is equal to a value on the order of about $10^3$ per line and is not so fine, so that it is difficult to express an interference fringe of a high spatial frequency, namely, a phase distribution. That is, in order to display a solid image in front of the space light modulating apparatus or in a wide visual field, a space light modulating element which can display an interference fringe at a high spatial frequency is needed. According to the pixel density of the present liquid crystal display apparatus, however, there is a problem such that an interference fringe at a high spatial frequency cannot be produced.

SUMMARY OF THE INVENTION

According to the invention, there is provided a space light modulating apparatus which can properly display a solid image by a phase distribution at a low spatial frequency. According to the space light modulating apparatus of the invention, in principle, an interference fringe as a phase distribution is produced on the space light modulating apparatus in which the phase distribution display surface has an arc-like curved surface and a solid image is displayed at a position near the center of the arc. A solid image, thus, can be stereoscopically displayed at a low spatial frequency. Actually, the phase display surface forming the curved surface is set to a virtual surface and a plurality of flat space light modulating units each having a predetermined area are arranged along the virtual surface, thereby forming a phase distribution display surface. That is, the space light modulating apparatus of the invention is characterized in that a plurality of flat space light modulating units each having a predetermined area for performing a wave front conversion while setting the position of a cross point of the normal line from the virtual display surface into a producing position of a solid image are arranged along the virtual display surface having a non-plane shape, for example, a cylindrical surface or a spherical surface to display the phase distribution.

According to the present invention, a stereoscopic display apparatus, in which a phase distribution of a virtual object is calculated, a space light modulating apparatus is driven and a solid image is displayed, is provided. The stereoscopic display apparatus comprises: phase distribution calculator for calculating a phase distribution (interference fringe) on the basis of 3-dimensional image information to be displayed; and display driver for displaying the phase distribution obtained by the phase distribution calculator to each of flat space light modulating units of the space light modulating apparatus and for allowing a solid image to be displayed by the wave front conversion by irradiation of a reference light.

According to such a space light modulating apparatus and a stereoscopic display apparatus of the invention, even in case of producing the same solid image, the solid image can be expressed by a diffraction of a low angle by producing an interference fringe to the space light modulating apparatus of a curved surface rather than producing an interference fringe to the space light modulating apparatus of a flat surface. Since the diffraction angle is low, the spatial frequency of the interference fringe can be also set to a low frequency. Particularly, by setting a position near the cross point of the normal line from the curved surface of the space light modulating apparatus (near the center of the spherical surface or arc) into a producing position of the solid image, a stereoscopic display can be performed by the diffraction of the lowest angle. On the other hand, since it is difficult in manufacturing to actually form micro pixels onto the space light modulating apparatus having a curved surface, a plurality of flat space light modulating units each having a small area are arranged. In this case, although the display surface of the phase distribution is locally flat, the stereoscopic display can be executed at a spatial frequency that is lower than that in the case where the whole display surface is formed by a flat surface.

The above and other objects, features, and advantages of the present invention will become more apparent from the following detailed description with reference to the drawings.

DETAILED DESCRIPTION OF THE PREFERRED EMBODIMENTS

Figure 1:
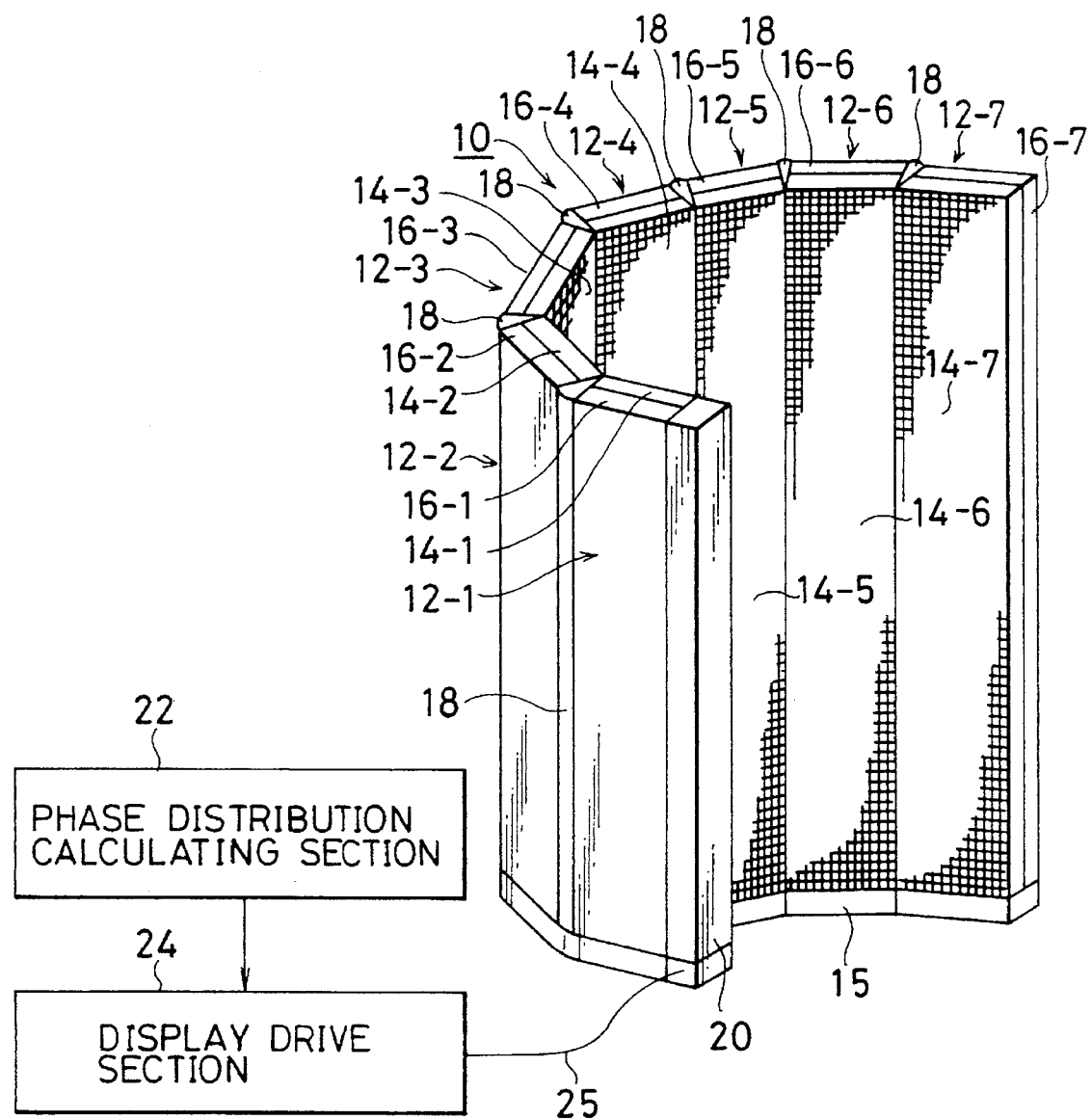
FIG. 1 is an explanatory diagram showing the first embodiment of the invention.

FIG. 1 shows the present first embodiment of the invention. A display section 10 is constructed by coupling seven space light modulating units 12-1 to 12-7 by flexible coupling portions 18. By attaching the display section 10 onto a base plate 15, the space light modulating units are arranged along a cylindrical surface having a predetermined radius. The space light modulating units 12-1 to 12-7 have a combination structure of liquid crystal display units 14-1 to 14-7 provided on the inside and illuminating units 16-1 to 16-7 provided on the outside, respectively. In each of the liquid crystal display units 14-1 to 14-7, a number of micro liquid crystal cells are arranged in a matrix form in order to display an interference fringe as a calculated phase distribution on the inside. A connector unit 20 is attached to the side surface of the space light modulating unit 12-1. A signal line 25 from a display driving section 24 is connected to the connector unit 20. A phase distribution calculating section 22 is provided for the display driving section 24.

Figure 2A:
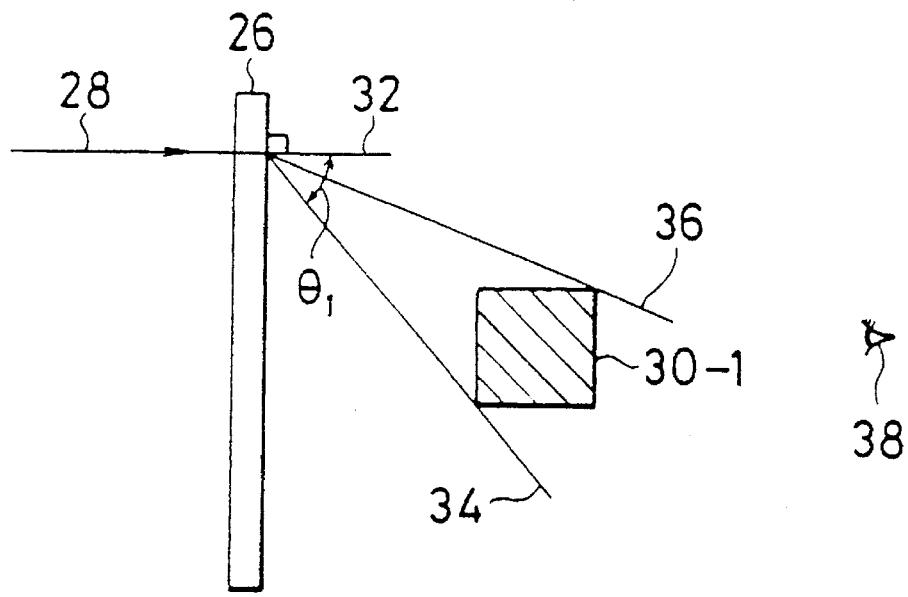
FIG. 2A is an explanatory diagram showing a conventional display of a real image.
Figure 2B:
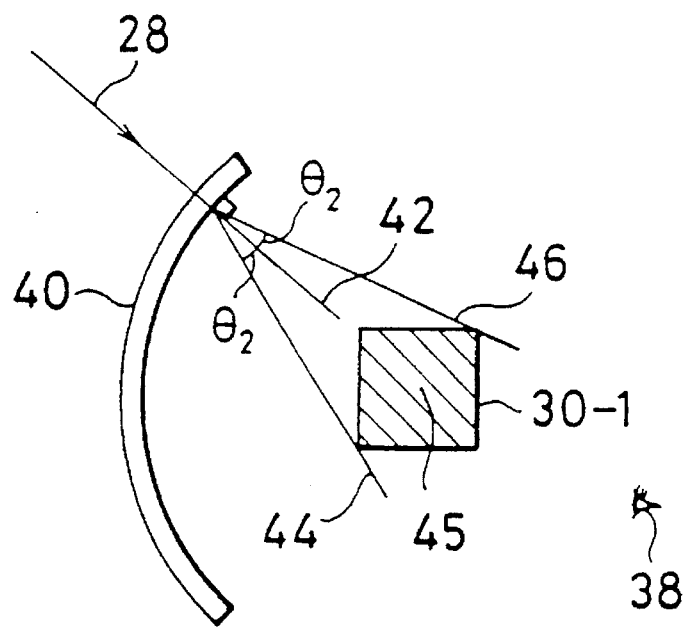
FIG. 2B is an explanatory diagram showing a display of a real image according to the invention.
Figure 3A:
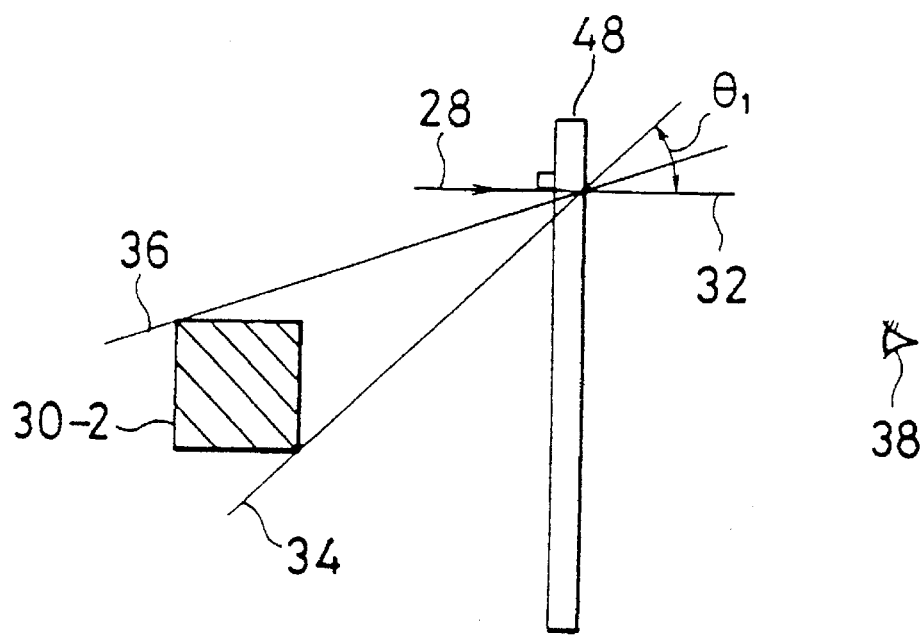
FIG. 3A is an explanatory diagram showing a conventional display of a virtual image.

The principle in which a proper solid image can be displayed at a low spatial frequency in the space light modulating apparatus of the invention will now be described. FIG. 2A is a diagram showing a conventional flat space light modulating apparatus 26. FIG. 2B is a diagram showing an arc-shaped space light modulating apparatus 40 with a principle construction of the invention. In the flat space light modulating apparatus 26 of FIG. 2A, in case of displaying a real image 30-1 when it is seen from a visual point 38 for the irradiation of a reference light 28, it is necessary to perform a diffraction at a large angle $\theta_1$ which is decided by a line 34 on the lower side of the real line 30-1 for a normal line 32. A phase distribution at a high spatial frequency must be displayed. On the other hand, as shown in FIG. 2B, in case of the arc-shaped space light modulating apparatus 40, by constructing such that a normal line 42 of the space light modulating apparatus 40 passes through a center 45 of the real image 30-1 to be displayed, a diffraction angle for the reference light 28 in case of displaying the real image 30-1 at the same position when it is seen from the visual point 38 can be set to a small angle $\theta_2$ for lines 44 and 46 which define both sides of the real image 30-1 from the normal line 42. Since the real image 30-1 can be displayed by the diffraction of such a small angle $\theta_2$ as mentioned above, a spatial frequency of an interference fringe as a phase distribution which is produced on the arc surface of the space light modulating apparatus 40 can be set to a low frequency. This point also shall apply to the display of a virtual image shown in each of FIGS. 3A and 3B.

Figure 3B:
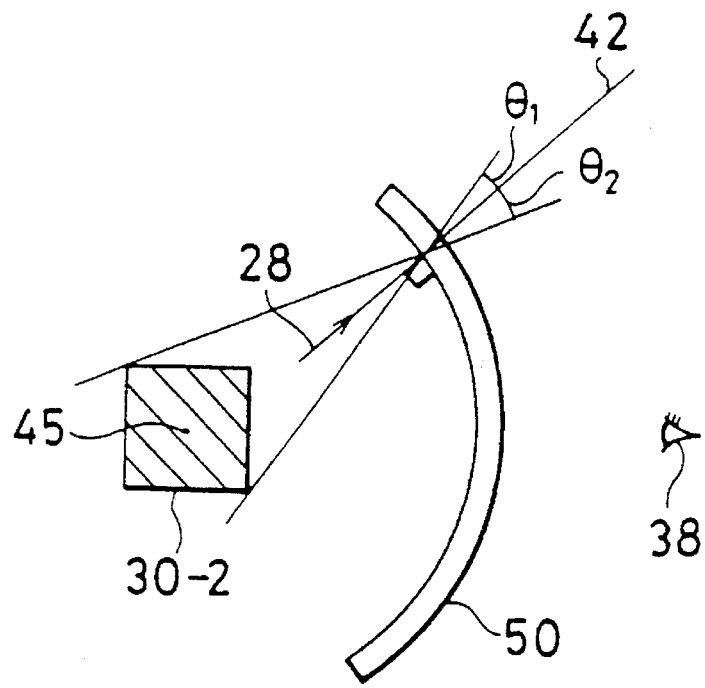
FIG. 3B is an explanatory diagram showing a display of a virtual image according to the invention.
Figure 4:
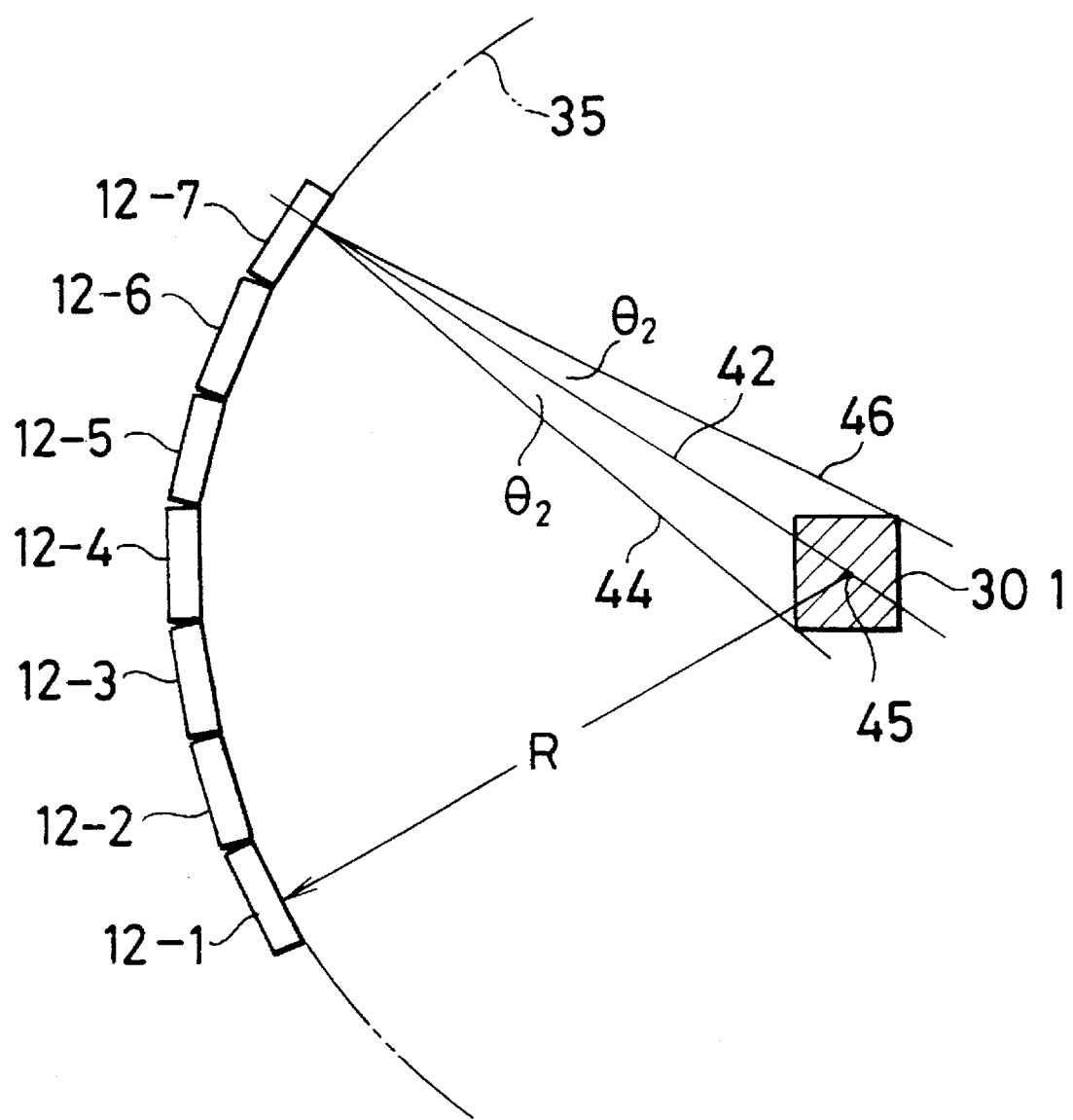
FIG. 4 is a plan view showing a display of a solid image by a display section in FIG. 1.

When manufacturing a liquid crystal, however, it is difficult to actually realize space light modulating apparatuses 40 and 50 each having an arc-shaped surface as shown in FIGS. 2B and 3B. According to the invention, therefore, as shown in FIG. 4, by virtually setting an arc 35 of a radius R, in which the center 45 is set to the display position of the real image 30-1, and by arranging a plurality of space light modulating units 12-1 to 12-7 along a virtual arc 35, a space light modulating apparatus having an arc-shaped surface is equivalently realized.

Figure 5:
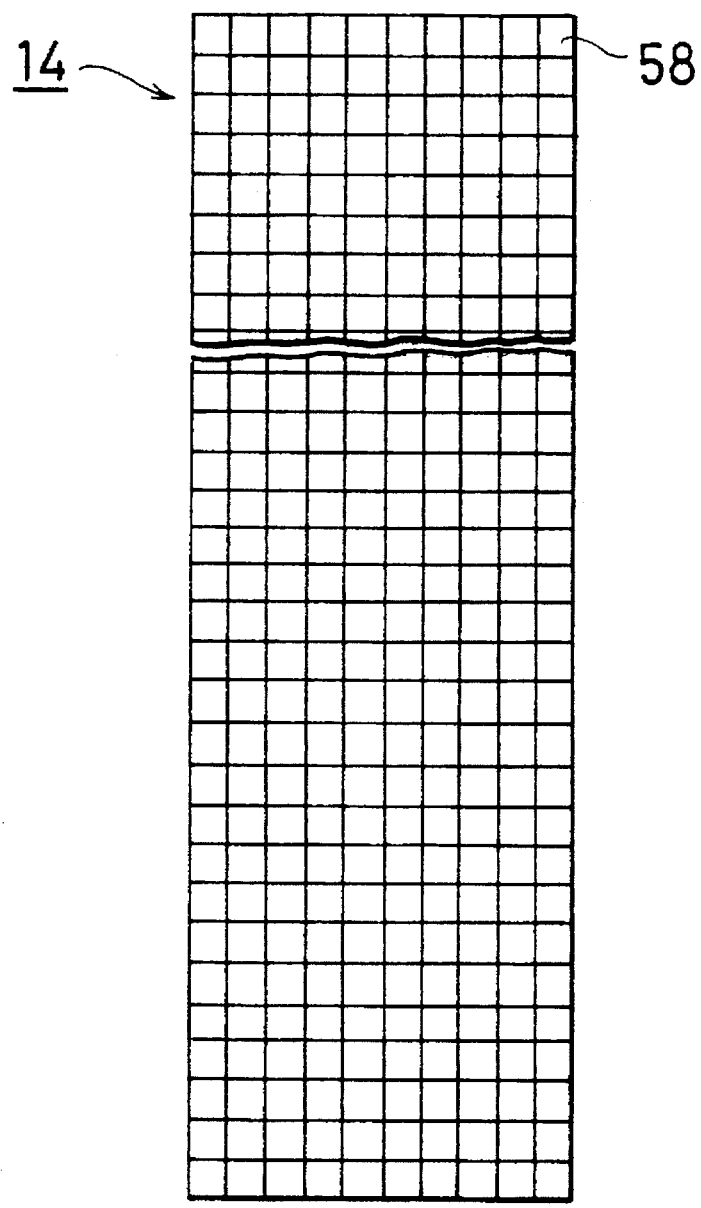
FIG. 5 is an explanatory diagram showing an embodiment of a display unit which is used in the embodiment of FIG. 1.

FIG. 5 is a diagram showing liquid crystal display units which are used in the space light modulating units 12-1 to 12-7 in FIG. 1. A number of micro liquid crystal cells 58 are arranged in a matrix formed on the display surface of the liquid crystal display unit 14.

Figure 6:
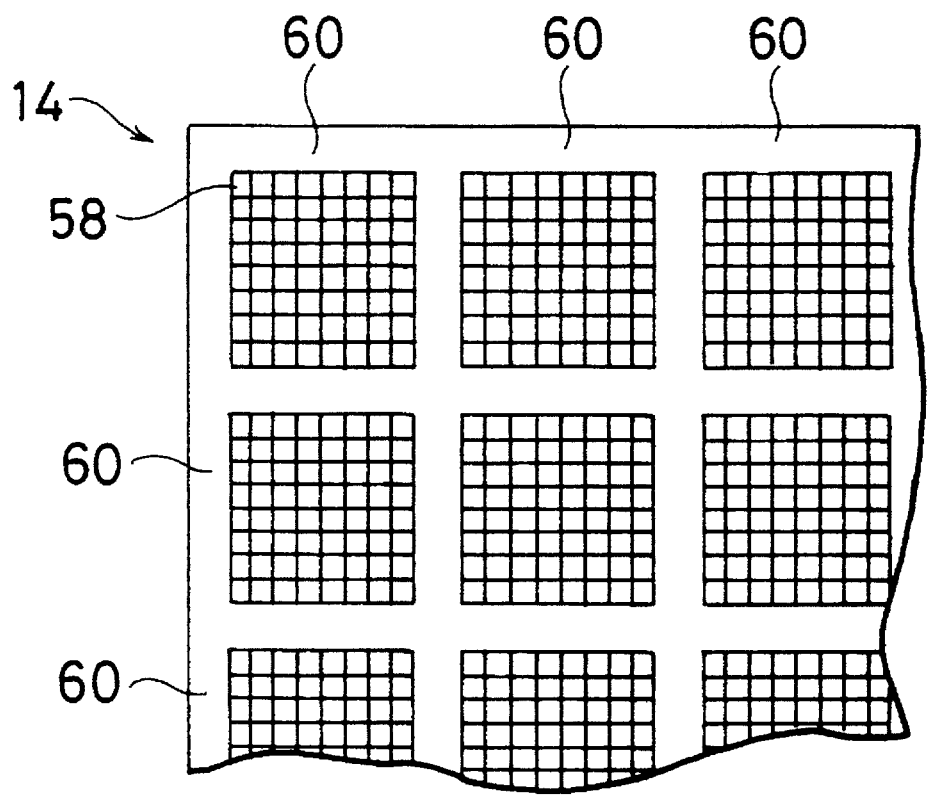
FIG. 6 is an explanatory diagram showing another embodiment of the display unit which is used in the embodiment of FIG. 1.

FIG. 6 shows another embodiment of the liquid crystal display unit 14 which is used in the embodiment of FIG. 1. The embodiment is characterized in that a liquid crystal segment 60, in which a predetermined number of liquid crystal cells 58 are arranged in a matrix form, is set to one unit, and in that a plurality of such liquid crystal segments 60 are two-dimensionally arranged in a matrix form. By combining a plurality of liquid crystal cells 58 in a matrix form for every liquid crystal segment 60 as mentioned above, the liquid crystal display unit 14 can be easily manufactured as compared with the case where the liquid crystal cells 58 are arranged on the whole surface as shown in FIG. 5.

Figure 7:
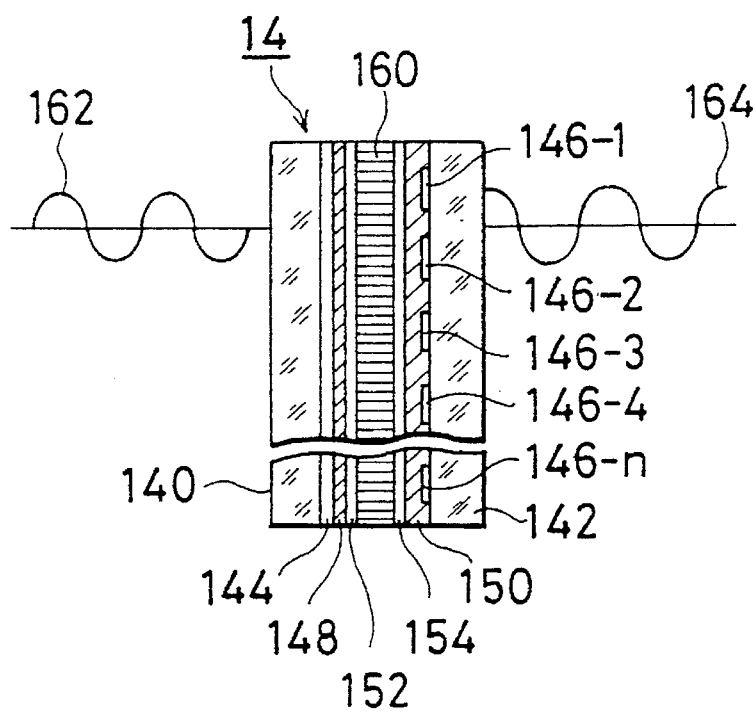
FIG. 7 is a cross sectional view of a liquid crystal display which is used as a display unit in the invention.

FIG. 7 shows a structure of the liquid crystal display unit which is used in the invention. The liquid crystal display unit 14 has a uniform transparent electrode 144 subsequent to a glass substrate 140 on the incident surface side. Branched transparent electrodes 146-1 to 146-n constructing one display segment are formed subsequent to a glass substrate 142 on the outgoing side. Orientation films 152 and 154 are provided through insulating layers 148 and 150 subsequent to the transparent electrodes 144 and 146-1 to 146-n. A liquid crystal 160 is provided between the orientation films 152 and 154. The liquid crystal display unit 14 is driven so that the voltage corresponding to the calculated phase information is applied to every liquid crystal cells which are decided by the divided electrodes 146-1 to 146-n. A refractive index of the liquid crystal cell for the transmitting direction of a reproduction light 162 is changed in accordance with the applied voltage.

Figure 8:
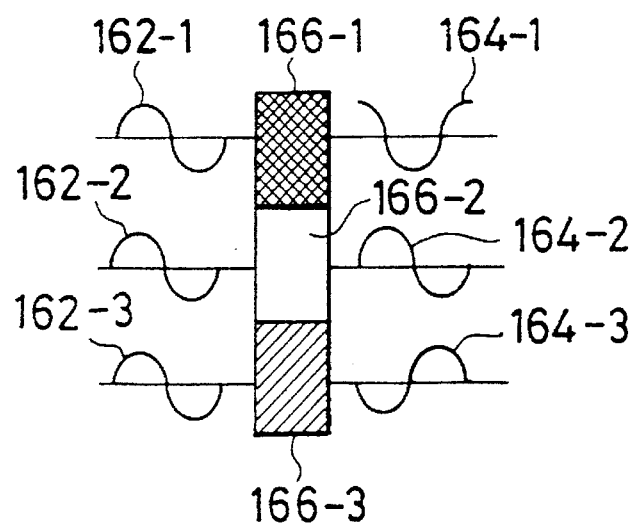
FIG. 8 is an explanatory diagram showing a phase modulation for a reproduction light with respect to three of liquid crystal cells in FIG. 7.

FIG. 8 shows a state of phase modulation with respect to three pixels of the liquid crystal display in FIG. 7 as an example. It is now assumed that reproduction lights 162-1 to 162-3 comprising, for instance, plane waves having the same phase entered from the left side into pixels 166-1, 166-2, and 166-3 which had been driven into different phase states, namely, to different refractive indices. In this case, since the optical distances in the liquid crystal differ in dependence on the pixels 166-1 to 166-3, phase deviations occur in lights 164-1 to 164-3 upon outgoing. It is ideally demanded that an arbitrary phase within a range of 0 to $2\pi$, namely, a range of a length corresponding to the wavelength as an optical distance can be expressed. Even when the phase is discretely expressed by multivalue levels, however, the phase distribution can be approximately expressed in a practical range. A depth of liquid crystal is decided so as to satisfy conditions such that the product $\Delta n \times d$ of the thickness d and a change $\Delta n$ in maximum refractive index which can be changed by the applied voltage is equal to a wavelength $\lambda$ of the reproduction light.

Figure 9:
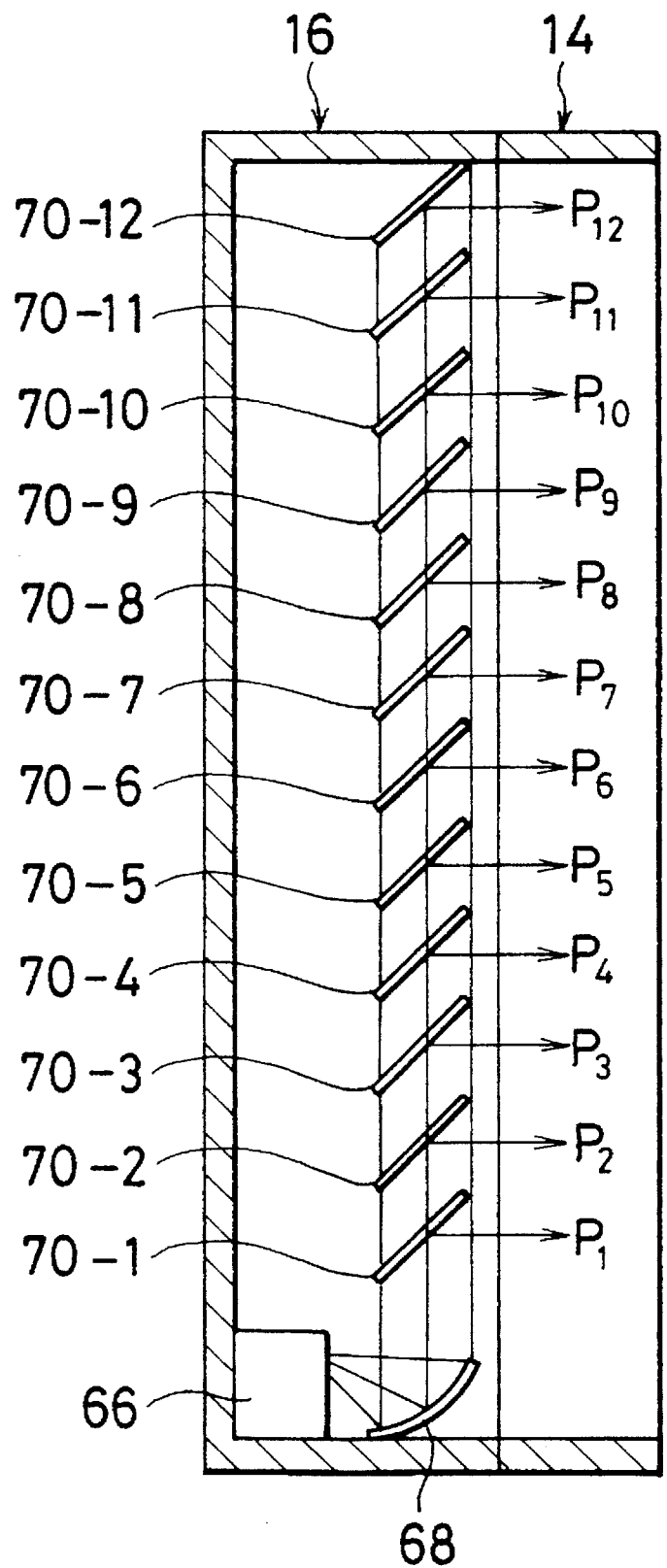
FIG. 9 is a cross sectional view showing a structure of an illuminating unit in FIG. 1.

FIG. 9 shows an embodiment of the illuminating units 16-1 to 16-2 provided on the back side of the space light modulating units 12-1 to 12-7 shown in FIG. 1. A laser light source 66 is built in on the lower side of the illuminating unit 16. It is desirable to use a small semiconductor laser as a laser light source 66. The semiconductor laser has a light emitting spectrum whose wavelength width is a few nm or less and can reconstruct a clear solid image. As a wavelength, an arbitrary wavelength can be used so long as it lies within a visible light range. It is necessary to consider a wavelength of light source which is used for reconstruction at the stage of calculating a phase distribution of a hologram. Specifically speaking, it is possible to use a semiconductor laser which emits the light of red whose wavelength is on the order of 600 nm, the light of green whose wavelength is on the order of 500 nm, or the light of blue whose wavelength is on the order to 400 nm. The light from the laser light source 66 is converted into the parallel light by a collimating mirror 68 and is irradiated upward. Twelve half mirrors 70-1 to 70-12 are arranged in the vertical direction of the illuminating unit 16 in the embodiment. The half mirrors 70-1 to 70-12 have transmission factors $T_1$ to $T_{12}$. Each half mirror reflects a part of the incident light. The reflected light enters the liquid crystal display unit 14 as a reproduction light. A part of the incident light also enters the next half mirror. Now, assuming that light intensities of the reflected lights from the half mirrors 70-1 to 70-12 are set to $P_1$ to $P_{12}$, all of the light intensities $P_1$ to $P_{12}$ need to be equalized. For this purpose, the transmission factors $T_1$ to $T_{12}$ of the half mirrors 70-1 to 70-12 are made different so as to equalize all of the light intensities $P_1$ to $P_{12}$. In the case where a coefficient i indicative at the position of the half mirror 70-12 which is farthest from the light source is set to i=12 and the coefficient i indicative of the half mirror 70-1 at the nearest position from the light source is set to i=1, the transmission factors $T_1$ to $T_{12}$ can be obtained as $$T_i = \{(n-i)/(n+1-i)\} \times 100 \, [\%]$$

where, n denotes the number of half mirrors and is set to n=12 in the embodiment. That is, it is sufficient that the transmission factors $T_1$, $T_2$, ..., $T_{11}$, and $T_{12}$ of the half mirrors 70-1 to 70-12 are set to $11/12$, $10/11$, ..., $1/2$, and 0, respectively.

The processing operation of the phase distribution calculating section 22 shown in FIG. 1 will now be described. First, the principle of the hologram will be explained. A hologram is obtained as follows. One laser beam is divided into two beams. One laser beam is irradiated to an object, so that a laser beam (object light) is scattered by the object. A hologram is obtained by an interference of two light fluxes of the laser beam (object light) and another laser beam (reference light). Now, assuming that a wave front of the reference light is set to $R \exp(j\phi_r)$ and a wave front of the object light is set to $O \exp(j\phi_o)$, an exposure intensity $I_H$ of the hologram is $$I_H = R^2 + O^2 + 2 \cdot R \cdot O \cdot \cos(\phi_o - \phi_r) \tag{1}$$

In case of developing the hologram, changes in amplitude and phase which are proportional to the exposure intensity $I_H$ of the equation (1) occur in the hologram. To electrically form a hologram, it is sufficient to use a space light modulating apparatus such as a liquid crystal device or the like which can change an amplitude or phase of the light. By inputting the same wave front as the reference light to the hologram formed as mentioned above, a hologram can be reconstructed. In the exposure intensity $I_H$ in the equation (1), only the third term of the right side contributes to the reconstruction of the object light. Therefore, when considering the third term of the right side, a transmission light T from the hologram is $$r = \sqrt{\{(X_i - X_{hi})^2 + (Y_i - Y_{hi})^2 + Z_i^2\}} \tag{4}$$

where, the first term of the right side in the equation (2) indicates that the wave front from the object was reproduced. The second term of the right side indicates a conjugate wave of the object light. From the above description of the principle, it will be understood that in order to obtain a phase distribution of the hologram, it is sufficient to calculate only the third term of the right side in the equation (1).

Figure 10:
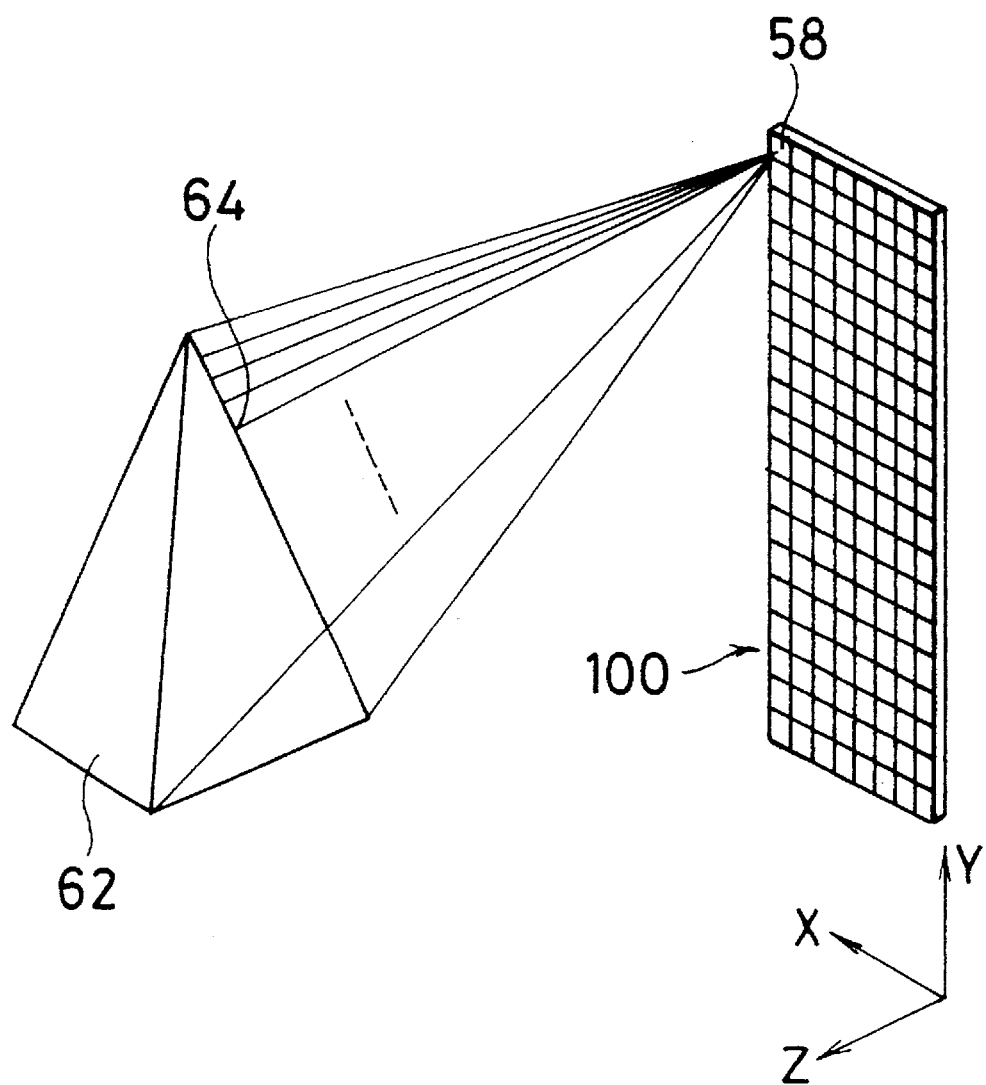
FIG. 10 is an explanatory diagram showing a principle of the phase distribution calculation in the invention.

FIG. 10 shows the principle to form a hologram in the invention. When regarding the reference light as a plane wave, a light intensity R can be ignored because an intensity of plane wave is not changed depending on the position. When the plane wave enters perpendicularly to the hologram surface, it is also possible to set the phase $\phi_r = 0$. An object 62 to be displayed here is positioned so that an axial center line of a virtual cylindrical surface passes through, for example, the center of gravity. The coordinate system of a target space is set so that a proper reference position is set to an origin. Now, assuming that a luminance (scattering degree) at a certain sampling point 64 having the coordinates $(X_i, Y_i, Z_i)$ of the object 62 is set to $I_i$, the exposure intensity $I_H$ of one liquid crystal cell of a hologram display surface 100 on which the display units 12 are arranged is $$I_H = \sum_i \{(I_i/r) \cdot \cos(k \cdot r)\} \quad (3)$$

where, k indicates the number of waves of the laser beam $$r = \sqrt{\{(X_i - X_{hi})^2 + (Y_i - Y_{hi})^2 + Z_i^2\}} \quad (4)$$

In case of FIG. 10, since the light from the object 62 reaches the whole area of the hologram display surface 100, the calculations of the equations (3) and (4) are executed with respect to the whole area of the hologram display surface 100.

Referring again to FIG. 1, in the first embodiment of the invention described above, a position on the center axis of the space light modulating units 12-1 to 12-7 arranged along the cylindrical surface is set to a display center position of the solid image. As shown in FIG. 10, a phase distribution which is expressed by each liquid crystal cell is calculated by the phase distribution calculating section 22 on a unit basis of each space light modulating unit 12-1. On the basis of the result of the calculation of the phase distribution, the space light modulating units 12-1 to 12-7 are driven by the display driving section 24 and the display driving according to the phase distribution is executed to each of the liquid crystal cells of the liquid crystal display units 14-1 to 14-7. At the same time, by irradiating reference lights as parallel lights by the illuminating units 16-1 to 16-7 from the back surface side as shown in FIG. 9, a solid image as a real image can be displayed in the display section 10. In this instance, the space light modulating units 12-1 to 12-7 are arranged along the arc in the horizontal direction and are flat in the vertical direction, so that the spatial frequency in the horizontal direction can be lowered.

Although the embodiment of FIG. 1 has been described with respect to a display format of the real image 30-1 shown in FIG. 2B as an example, a display format of a virtual image as shown in FIG. 3B can be also used. Although FIG. 1 shows a state in which the space light modulating units 12-1 to 12-7 are arranged in an arc shape in the horizontal direction, by falling down the display section 10 as a whole, the space light modulating units 12-1 to 12-7 can be arranged along the cylindrical surface in the vertical direction.

Figure 11:
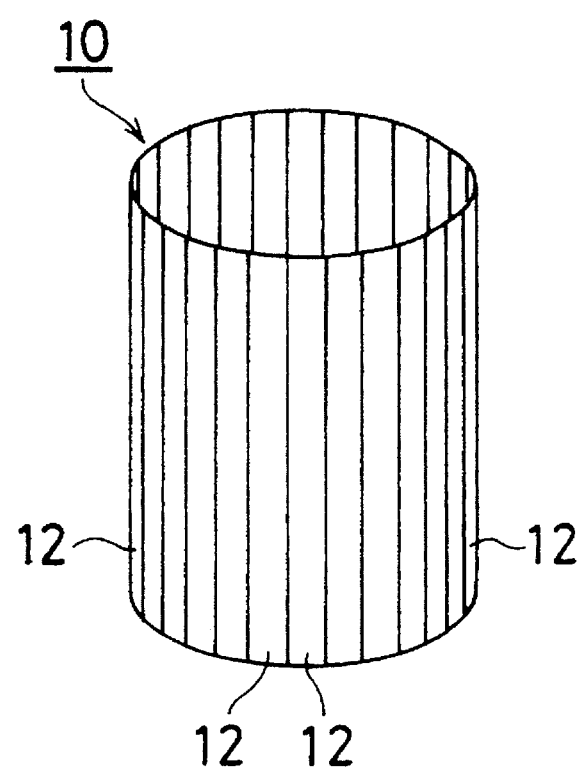
FIG. 11 is an explanatory diagram showing the second embodiment of a space light modulating apparatus according to the invention.

FIG. 11 shows the second embodiment of a space light modulating apparatus of the invention and is characterized in that the same space light modulating units 12 as the space light modulating units 12-1 to 12-7 shown in FIG. 1 are arranged in a perfect arc shape along the cylindrical surface.

Figure 12:
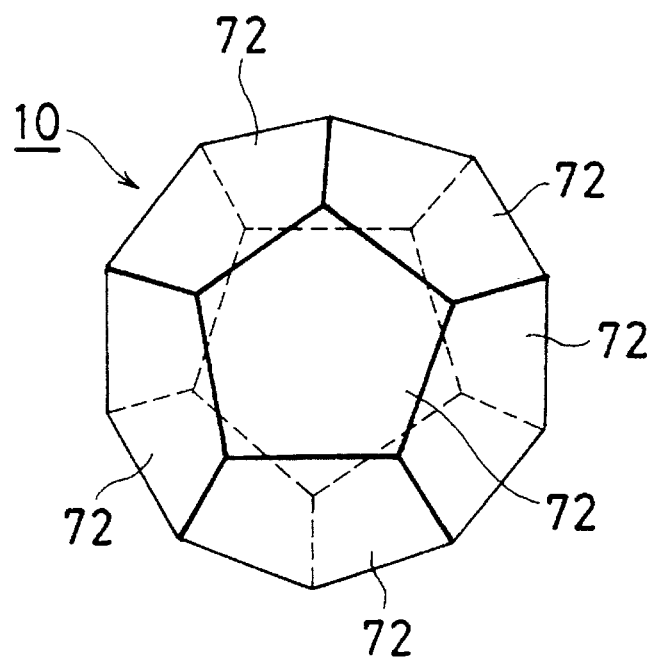
FIG. 12 is an explanatory diagram showing the third embodiment of a space light modulating apparatus which is constructed by a regular dodecahedron.
Figure 13:
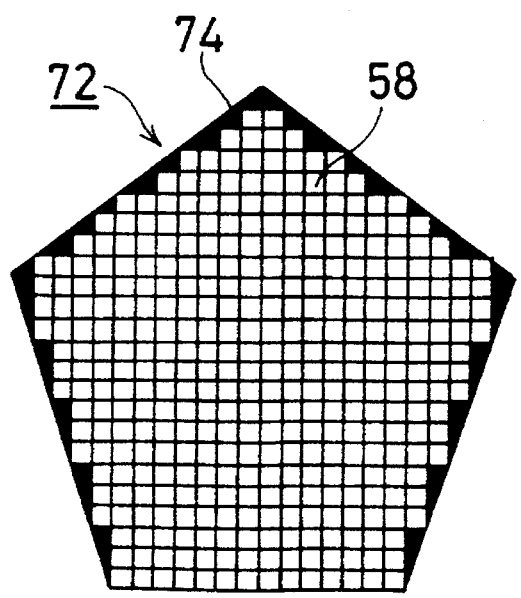
FIG. 13 is an explanatory diagram showing a space light modulating unit of a regular pentagon which is used in the embodiment of FIG. 12.

FIG. 12 shows the third embodiment of the invention and is characterized in that the display section 10 of a regular dodecahedron is formed by arranging space light modulating units 72 each having a regular pentagon. FIG. 13 shows one of the space light modulating units 72 of the regular pentagon which are used in the space light modulating apparatus that is constructed by the regular dodecahedron of FIG. 12. A liquid crystal display units shown in FIGS. 7 and 8 are used and the liquid crystal cells 58 are arranged in a matrix form in regions other than a non-display region 74 shown by a black area.

Figure 14:
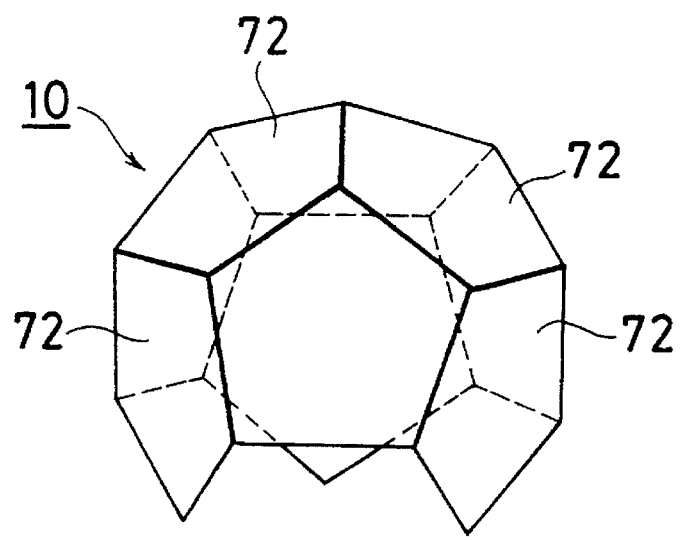
FIG. 14 is a constructional diagram showing a modification of the third embodiment in which a part of FIG. 12 is omitted.

FIG. 14 shows a modification of FIG. 12 and is characterized in that three space light modulating units 72 of the regular pentagon arranged on the lower side of the display section 10 which is constructed by the regular dodecahedron of FIG. 12 are removed, thereby forming a dome shape.

Figure 15:
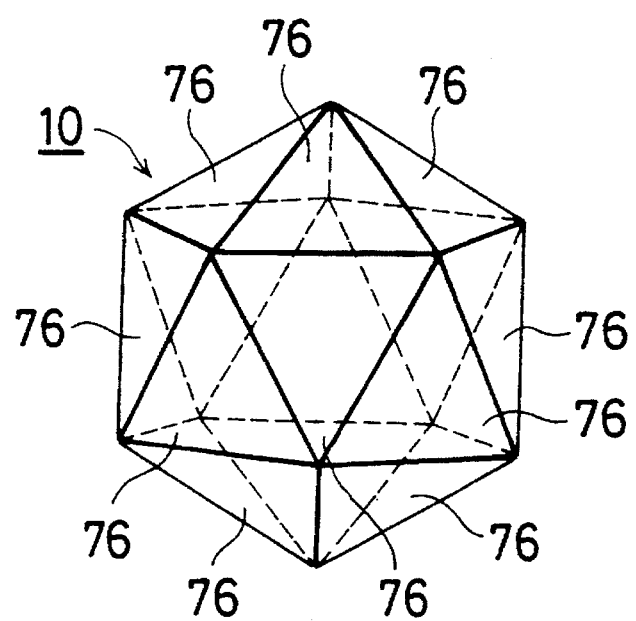
FIG. 15 is an explanatory diagram showing the fourth embodiment of a space light modulating apparatus which is constructed by a regular trisoctahedron.
Figure 16:
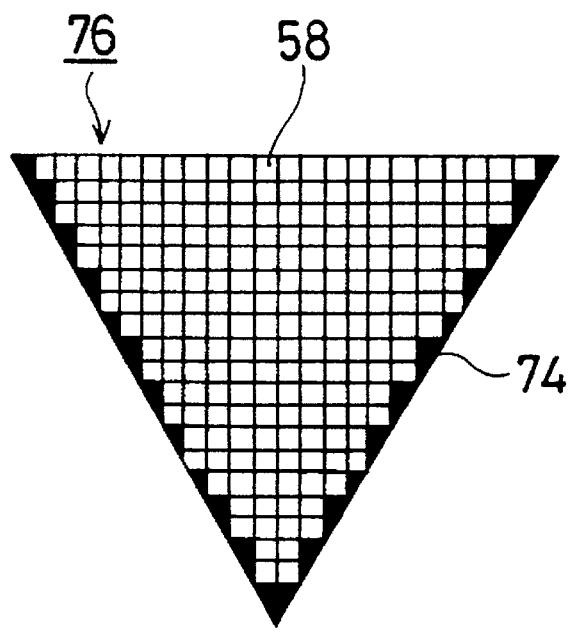
FIG. 16 is an explanatory diagram of a space light modulating unit of a regular triangle which is used in the embodiment of FIG. 15.

FIG. 15 shows the fourth embodiment of a space light modulating apparatus of the invention and is characterized in that the display section 10 of a regular trisoctahedron is formed by arranging space light modulating units 76 of a regular triangle along a spherical surface. The space light modulating units 76 of a regular triangle which are used in the embodiment have an arrangement structure of the liquid crystal cells 58 shown in FIG. 16.

Figure 17:
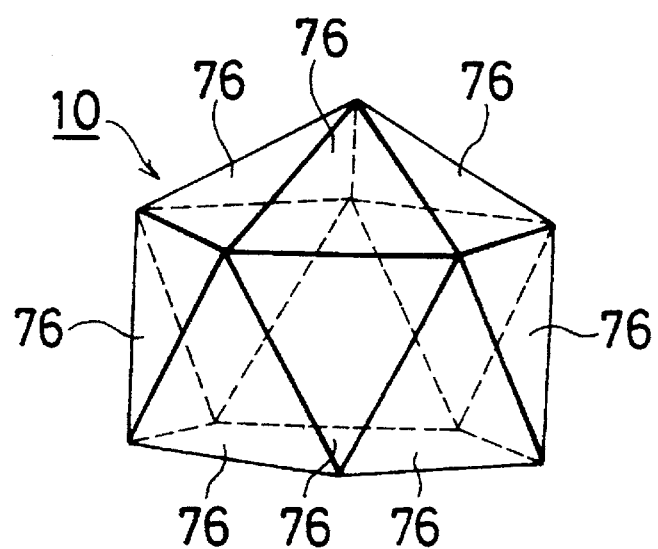
FIG. 17 is an explanatory diagram showing a modification of the fourth embodiment in which a part of FIG. 15 is omitted.

FIG. 17 is characterized in that the five space light modulating units 76 of the regular triangle on the lower side with respect to the fourth embodiment of FIG. 15 are removed, thereby forming a dome shape.

Figure 18:
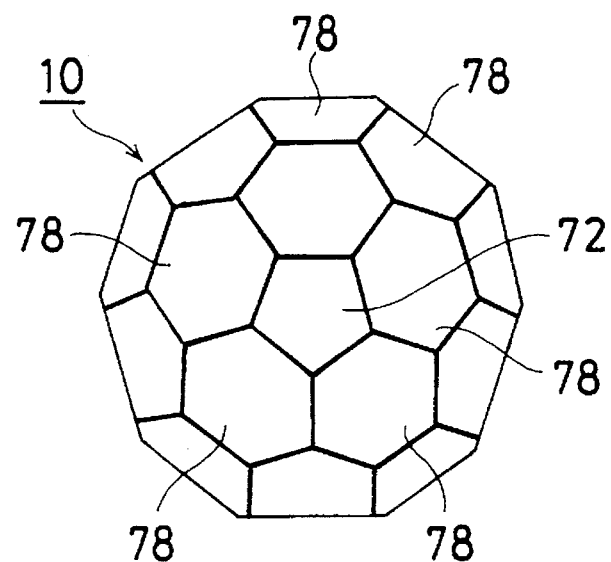
FIG. 18 is an explanatory diagram showing the fifth embodiment of a space light modulating apparatus which is constructed by a polyhedron comprising a combination of a regular pentagon and a regular hexagon.
Figure 19:
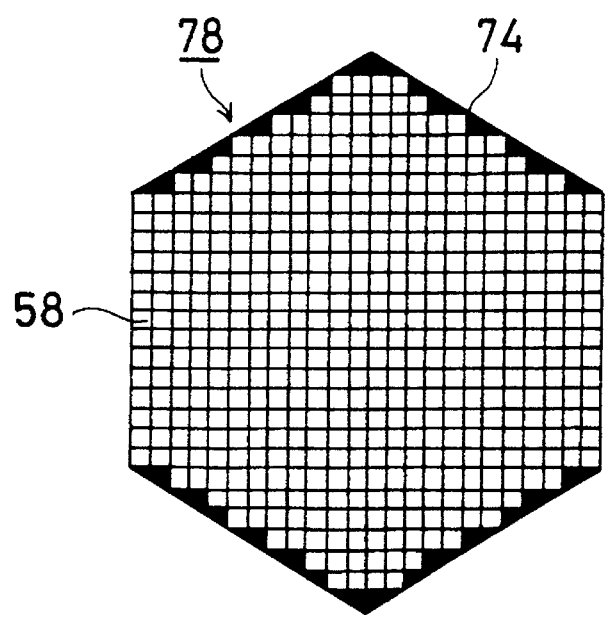
FIG. 19 is an explanatory diagram of a space light modulating unit of a regular hexagon which is used in the embodiment of FIG. 18.
Figure 20:
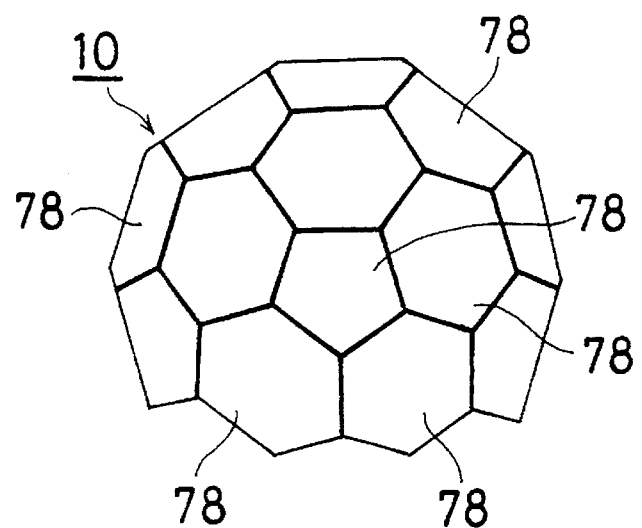
FIG. 20 is an explanatory diagram showing a modification of the fifth embodiment in which a part of FIG. 18 is omitted.

FIG. 18 shows the fifth embodiment of a space light modulating apparatus of the invention and is characterized in that the display section 10 as a polyhedron of the Fullerene type is formed by combining the space light modulating units 72 of the regular pentagon and space light modulating units 78 of a regular hexagon along a spherical surface. The space light modulating units 78 of the regular hexagon which are used in FIG. 18 have a matrix-like arrangement of the liquid crystal cells 58 shown in FIG. 19. FIG. 20 is characterized in that a dome shape is formed by removing the portion on the lower side of the display section 10 comprising polyhedrons of the Fullerene type of FIG. 18.

Figure 21:
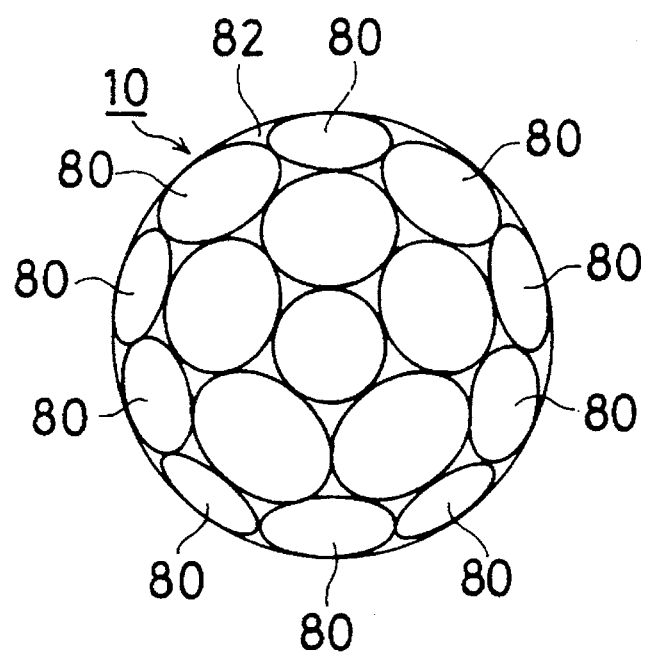
FIG. 21 is an explanatory diagram showing the sixth embodiment of a space light modulating apparatus which is constructed by polyhedrons arranged in a spherical shape.
Figure 22:
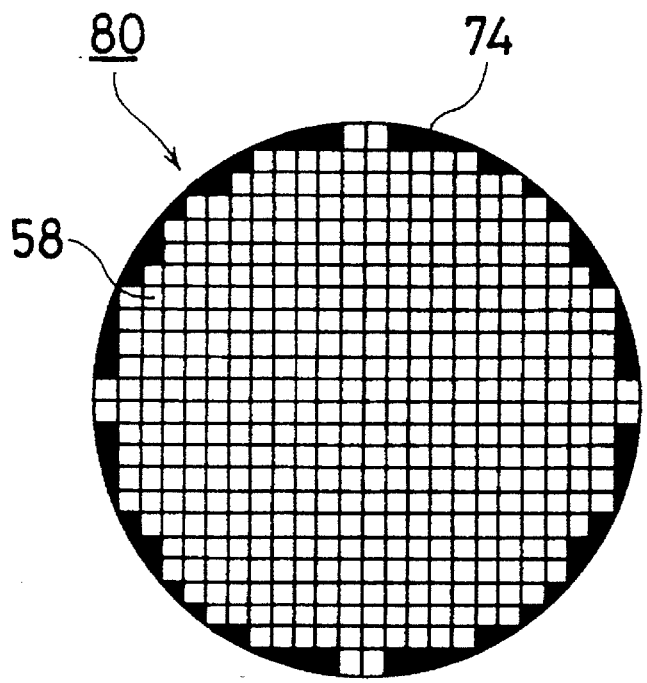
FIG. 22 is an explanatory diagram of a circular space light modulating unit which is used in the embodiment of FIG. 21.
Figure 23:
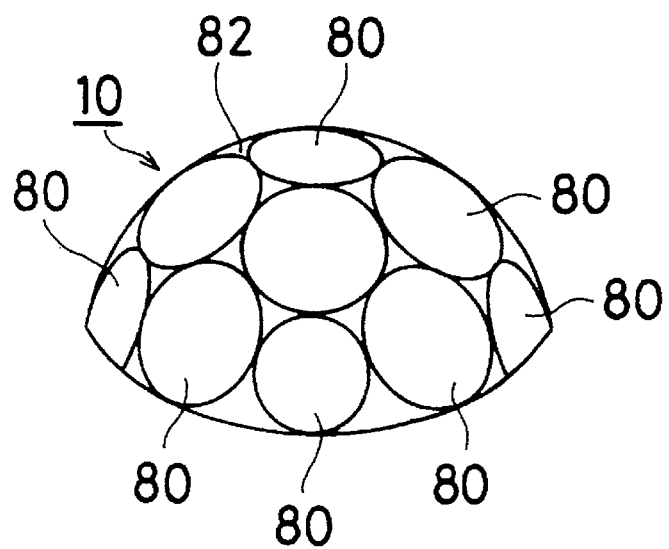
FIG. 23 is an explanatory diagram showing a modification of the sixth embodiment in which a part of FIG. 21 is omitted.

FIG. 21 shows the sixth embodiment of a space light modulating apparatus of the invention and is characterized in that the display section 10 is formed by arranging circular space light modulating units 80 having a matrix arrangement of the liquid crystal sells 58 shown in FIG. 22 along a spherical surface. FIG. 23 is characterized in that a dome shape is formed by removing the lower half portion of FIG. 21.

In each of the embodiments of FIGS. 12 to 23, since the space light modulating units each comprising a polyhedron or circular shape for the spherical surface are arranged by an inscription or circumscription, the spatial frequency can be lowered by reducing the diffraction angles in all of the directions including the horizontal and vertical direction. A size of the space light modulating apparatus in each of the foregoing embodiments is properly decided as necessary and is not limited.

According to the invention as mentioned above, by arranging a plurality of flat space light modulating units along a non-flat shape, a stereoscopic display can be performed at a low spatial frequency. Even when a pixel density is small, a solid image can be displayed on a large screen. A clear solid image can be displayed because it is not so far away from the visual point.

What is claimed is:

1. A space light modulating apparatus comprising a plurality of flat space light modulating units, each flat space light modulating unit having a predetermined area for executing a wave front conversion while setting a position near a cross point position of a normal line from a virtual display surface of a non-flat shape to produce a solid image, wherein the flat light modulating units are arranged along said virtual display surface, each of said space light modulating units comprises a display unit for displaying a phase distribution and an illuminating unit, integrally fixed to a rear side of said display unit, for irradiating a reference light to said display unit, thereby allowing a solid image to be reproduced at the cross point position of the normal line from said virtual display surface, and said illuminating unit comprises a laser light source, collimating means for inputting a laser beam from said laser light source, reflecting said laser beam toward an opening to said display unit, converting a spherical wave of said incident laser beam into a flat wave, and light distributing means for distributing a collimating light from said collimating means to said display unit and irradiating as a reproduction light.

2. An apparatus according to claim 1, wherein a plurality of flat space light modulating units are arranged so as to be inscribed in said virtual display surface.

3. An apparatus according to claim 1, wherein a plurality of flat space light modulating units are arranged so as to be circumscribed on said virtual display surface.

4. An apparatus according to claim 1, wherein a virtual display surface of the non-flat shape is a cylindrical surface and a plurality of flat space light modulating units are arranged along said virtual cylindrical surface.

5. An apparatus according to claim 4, wherein a plurality of flat space light modulating units are arranged in a part of said virtual cylindrical surface.

6. An apparatus according to claim 1, wherein said virtual display surface of the non-flat shape is a spherical surface and a plurality of flat space light modulating units are arranged along said virtual spherical surface.

7. An apparatus according to claim 6, wherein a plurality of flat space light modulating units are arranged in a part of said virtual spherical surface.

8. An apparatus according to claim 6, wherein a plurality of flat space light modulating units are arranged along said virtual spherical surface, thereby forming display means of a polyhedron.

9. An apparatus according to claim 6, wherein said space light modulating unit is set into a regular polyhedron shape and a plurality of said space light modulating units are arranged along said virtual spherical surface, thereby forming display means of a regular polyhedron.

10. An apparatus according to claim 6, wherein said space light modulating unit is set into one kind of circular shape and a plurality of said space light modulating units are arranged along said virtual spherical surface, thereby forming display means of a polyhedron.

11. An apparatus according to claim 1, wherein said display unit is constructed by two-dimensionally arranging micro pixel structures to express a phase distribution in a matrix form.

12. An apparatus according to claim 1, wherein said display unit has an array such that the number of micro pixels to express a phase distribution partially changes every row or column.

13. An apparatus according to claim 1, wherein in said pixel structure, an amplitude, a phase, or a polarizing state of the light is changed.

14. An apparatus according to claim 1, wherein said display unit is a liquid crystal display apparatus in which micro liquid crystal cells are two-dimensionally arranged in a matrix form.

15. An apparatus according to claim 1, wherein said light distributing means is constructed by arranging a plurality of half mirrors, and each of said half mirrors reflects a part of incident light and irradiates the reproduction light to said display unit and also transmits a part of the incident light, thereby allowing the transmitted light to enter the half mirror at a next stage.

16. An apparatus according to claim 15, wherein said light distributing means is constructed in a manner such that a plurality of half mirrors are arranged at regular intervals in the irradiating direction of the laser beam outputted from said collimating means, each of said plurality of half mirrors reflects a part of the incident light, irradiates the reproduction light to said display unit, transmits a remaining part of the incident light, and inputs to the next stage, add further a transmission factor Ti of the ith mirror is defined to $$Ti=\{(n-1)/(N+1-i)\}\times 100 \ [\%]$$

when it is assumed that the number of mirrors is set to n and coefficients i indicative of the positions of the mirrors from said collimating mirror side are set to i=1, 2, 3, . . . , and n.

17. A stereoscopic display apparatus comprising:

space light modulating means, including a plurality of flat space light modulating units each having a predetermined area for performing a wave front conversion while setting a cross point position of a normal line from a virtual display surface of a non-flat shape to produce a solid image, in which the flat space modulating units are arranged along said virtual display surface and each of said space light modulating units comprises a display unit for displaying a phase distribution and an illuminating unit, integrally fixed to a rear side of said display unit, for irradiating a reference light to said display unit, thereby allowing a solid image to be reproduced at the cross point position of the normal line from said virtual display surface;

phase distribution calculating means for calculating a phase distribution on the basis of 3-dimensional image information to be displayed; and display driving means for displaying the phase distribution obtained by said phase distribution calculating means to each of said display units provided for said flat space light modulating units of said space light modulating means, thereby allowing a solid image to be displayed by the wave front conversion by an irradiation of the reference light to each of said display units by each of said illuminating units, wherein the illuminating unit of said space light modulating means has a laser light source, collimating means for inputting a laser beam from said laser light source, reflecting said laser beam toward an opening to said display unit, converting a spherical wave of said incident laser beam into a flat wave, and light distributing means for distributing a collimating light from said collimating means to said display unit and irradiating as a reproduction light.

18. An apparatus according to claim 17, wherein said space light modulating means is constructed by arranging a plurality of flat space light modulating units so as to be inscribed in said virtual display surface.

19. An apparatus according to claim 17, wherein said space light modulating means is constructed by arranging a plurality of flat space light modulating units so as to be circumscribed on said virtual display surface.

20. An apparatus according to claim 17, wherein said space light modulating means is constructed by arranging a plurality of flat space light modulating units along a virtual cylindrical surface.

21. An apparatus according to claim 20, wherein said space light modulating means is constructed by arranging a plurality of flat space light modulating units in a part of said virtual cylindrical surface.

22. An apparatus according to claim 17, wherein said space light modulating means is constructed by arranging a plurality of flat space light modulating units along a virtual spherical surface.

23. An apparatus according to claim 22, wherein said space light modulating means is constructed by forming display means of a polyhedron by arranging a plurality of flat space light modulating units along said virtual spherical surface.

24. An apparatus according to claim 22, wherein said space light modulating means is constructed by forming display means of a regular polyhedron by setting said space light modulating unit into a regular polyhedron shape and by arranging a plurality of said space light modulating units along said virtual spherical surface.

25. An apparatus according to claim 22, wherein said space light modulating unit is set into one kind of circular shape and a plurality of said space light modulating units are arranged along said virtual spherical surface, thereby forming display means of a polyhedron.

26. An apparatus according to claim 17, wherein said display unit is constructed by two-dimensionally arranging micro pixel structures to express a phase distribution in a matrix form.

27. An apparatus according to claim 17, wherein said display unit has an array such that the number of micro pixels to express a phase distribution is partially changed every row or column.

28. An apparatus according to claim 17, wherein in said pixel structure, an amplitude, a phase, or a polarizing state of the light is changed.

29. An apparatus according to claim 17, wherein said illuminating unit comprises: a light source to generate a reproduction light; converting means for converting a light from said light source into a collimation light; and light distributing means for distributing the collimation light from said converting means to said display units, thereby allowing the light to enter as a reproduction light.

30. An apparatus according to claim 29, wherein said light distributing means is constructed in a manner such that a plurality of half mirrors are arranged at regular intervals in the irradiating direction of the laser beam outputted from said collimating means, each of said plurality of half mirrors reflects a part of the incident light, irradiates the reproduction light to said display unit, transmits a remaining part of the incident light, and inputs to the next stage, and further a transmission factor Ti of the ith mirror is defined to $$Ti = \{(n-1)/(N+1-i)\} \times 100 \, [\%]$$

when it is assumed that the number of mirrors is set to n and coefficients i indicative of the positions of the mirrors from said collimating mirror side are set to i=1, 2, 3, . . . , and n.

31. An apparatus according to claim 30, wherein said plurality of half mirrors have different transmission factors so as to equalize intensities of all of the reflected lights.

* * * * *

UNITED STATES PATENT AND TRADEMARK OFFICE
CERTIFICATE OF CORRECTION

PATENT NO. : 5,594,559
DATED : January 14, 1997
INVENTOR(S) : Noriko Sato, et. al.

It is certified that error appears in the above-indentified patent and that said Letters Patent is hereby corrected as shown below:

Item [54]
COVER PAGE, please change the title to read as follows: --SPACE LIGHT MODULATING APPARATUS AND STEREOSCOPIC DISPLAY APPARATUS FOR DISPLAYING STEREOSCOPIC IMAGE BY HOLOGRAM--.

Col. 1, line 1, change "STEREOSCOPIC DISPLAY APPARATUS" to --SPACE LIGHT MODULATING APPARATUS AND STEREOSCOPIC DISPLAY APPARATUS FOR DISPLAYING STEREOSCOPIC IMAGE BY HOLOGRAM--.

line 20, delete "a"--.
Column 6, line 49, change equation number "(4)" 5to -- (2)--.
Column 10, claim 16, line 2, change "add" to --and--.

Signed and Sealed this

Third Day of June, 1997

Attest:

BRUCE LEHMAN

*Attesting Officer*  *Commissioner of Patents and Trademarks*